Jan. 14, 1941.                L. B. WALES                 2,228,795
                ELASTIC FLUID TURBINE PACKING ARRANGEMENT
                         Filed June 17, 1938
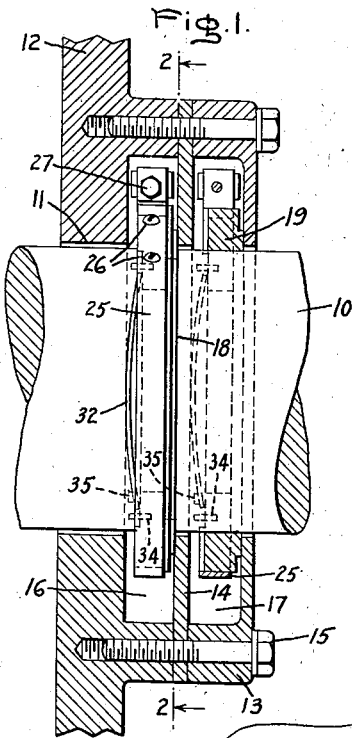
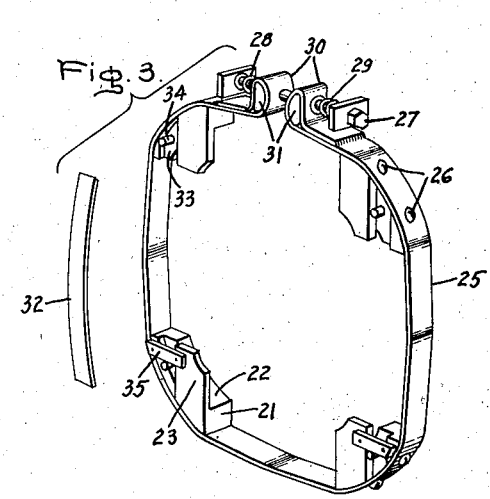
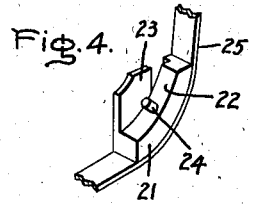
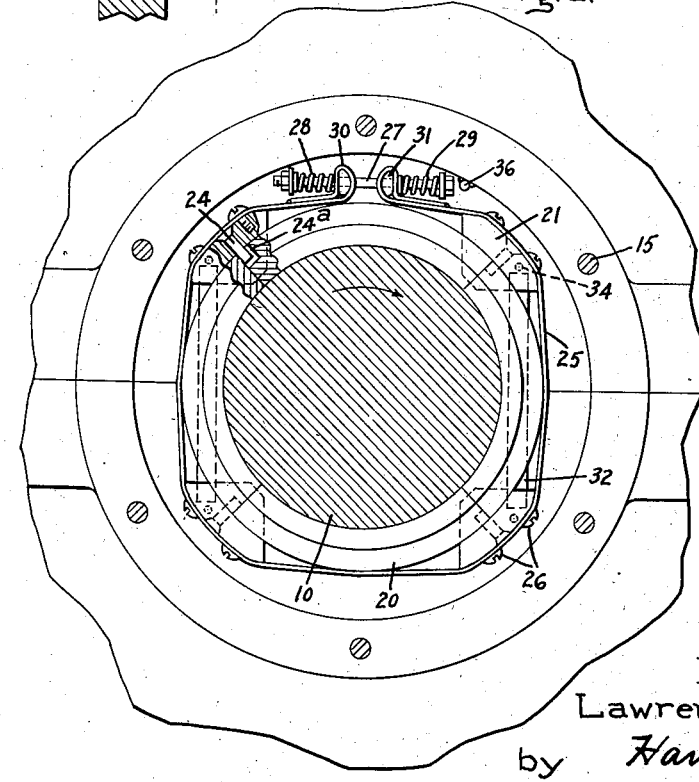
Inventor:
Lawrence B. Wales,
by Harry E. Dunham
His Attorney.

Patented Jan. 14, 1941

2,228,795

UNITED STATES PATENT OFFICE 2,228,795

ELASTIC FLUID TURBINE PACKING ARRANGEMENT

Lawrence B. Wales, Marblehead, Mass., assignor to General Electric Company, a corporation of New York Application June 17, 1938, Serial No. 214,256

2 Claims. (Cl. 286—24)

The present invention relates to elastic fluid turbine packing arrangements for reducing leakage along a rotatable shaft projecting through a casing opening. More specifically, the invention relates to the kind of packing arrangements which comprise a plurality of segments held in archbound relation by a band surrounding the segments and spring means biasing the ends of the band together. Difficulties have been experienced with this type of packings because the segments often do not remain aligned with the result that the diameter of the packing ring becomes larger in one direction than in the other.

The object of my invention is to provide an improved construction and arrangement of packing arrangements whereby the aforementioned drawback is overcome. This is accomplished in accordance with my invention by the provision of a packing arrangement in which the joining ends of adjacent segments are bridged by a block and the bridging blocks are biased towards the outer surfaces of the segments by means including a band and a spring surrounding the segments. In a preferred embodiment the blocks have side walls to define supports for flat springs for biasing the packing ring sidewise towards a sealing wall or partition and to maintain the segments laterally aligned.

For a better understanding of what I believe to be novel and my invention, attention is directed to the following description and the claims appended thereto in connection with the accompanying drawing.

In the drawing, Fig. 1 illustrates a sectional view of a packing arrangement embodying my invention; Fig. 2 is a section along line 2—2 of Fig. 1; and Figs. 3 and 4 are perspective detail views of certain parts of Fig. 1.

The arrangement comprises a shaft 10 which projects through an opening 11 in a turbine casing 12. The casing 12 forms a part of a packing casing. The other parts of this casing include a casing member 13 and a partition 14 secured to the turbine casing by bolts 15 to form packing chambers 16 and 17. Each chamber contains a packing with packing rings 18 and 19 respectively. The ring 18 has sealing contact with the partition 14 and the packing ring 19 has sealing contact with the casing member 13. Each ring, as shown in Fig. 2, comprises a plurality of segments 20 in archbound relation surrounding and floating on the shaft. The end portions of adjacent segments 20 are engaged by blocks 21. Each block has a cylindrical surface 22 engaging the outer surfaces of adjacent segments and each block has a side wall or projection 23 engaging the sides of adjacent segment portions. The cylindrical surfaces 22 of the blocks engaging the cylindrical surfaces of the packing segments serve to maintain alignment of the segments in radial direction, whereas the side portions 23 engaging the sides of adjacent segments serve to maintain lateral alignment of the different segments. Each block has a radial pin 24 projecting into a recess 24a formed in the end portion of each segment. The pins 24 prevent circumferential displacement between the blocks and the adjoining end portions of the segments. The present invention comprises four segments bridged by four such blocks which latter are secured to a band 25 by screws 26. The end portions of the band are connected and biased towards each other by means including a bolt 27 and springs 28, 29. In order to assure a good connection between the bolt and the ends of the band, each of said ends forms a loop 30 surrounding a filling or reinforcing member 31. The loops with the filling members define solid end portions of the band and with the springs 28 and 29 reduce slackening of the band due to differential expansion between band 25 and the packing ring. Each packing ring is biased laterally into sealing engagement with the partition and casing member respectively by means of two flat leaf springs 32. The ends of the leaf springs 32 are supported on the blocks. To this end the side walls 23 of the blocks are partly removed to form grooves 33. A pin 34 is provided in each groove to form stops for the ends of the leaf springs 32 and the grooves of at least two segments are partly covered by members 35 to prevent the springs from slipping out laterally. The middle portion of each leaf spring 32 bears against a wall, the springs for the packing ring 18 bear against the casing 11 and the springs for the packing ring 19 bear against the partition 14 (Fig. 1) to bias these packing rings into sealing engagement with the partition and the casing member 13 respectively.

As shown in Fig. 2, the band 25 engages the packing ring, that is, the segments 20 intermediate adjacent blocks. The shaft 10 in the arrangement shown, as indicated by an arrow, is intended to rotate in clockwise direction. In order to prevent rotation of the packing ring, I provide a stop 36 on the casing adjacent the right-hand end of each bolt 27 when viewed as shown in Fig. 2.

Thus, with my invention I have accomplished an improved construction and arrangement for packings whereby segmental packing rings are maintained in alignment both radially and laterally. An important feature of the arrangement, as stated above, is the provision of short, segmental blocks interposed between the segments and the band surrounding the segments. These blocks engage the joint-forming end portions of adjacent segments and maintain them in alignment and at the same time the blocks form supports for leaf springs which bias the packing ring towards a sealing wall, that is, into sealing engagement with a partition or a casing wall.

The horizontal joint of the packing box is placed slightly above the center of the shaft, thus making it possible completely to assemble the ring in the cell with springs 32 in place and bearing against the rear cell walls before the top half of the packing casing is assembled. This allows the ring to be located and held in a central position relative to the shaft with the upper casing half removed and when assembled the upper casing half does not disturb the ring.

What I claim as new and desire to secure by Letters Patent of the United States, is:

1. Packing arrangement comprising a wall having an opening, a rotary shaft projecting through the opening, a packing ring surrounding and floating on the shaft adjacent the wall and having a plurality of segments with end faces engaging each other, each segment having a recessed end portion, a plurality of blocks each having a cylindrical surface engaging the outer surface of adjacent segments and a wall portion engaging the sides of adjacent segments, a pin secured to each block and projecting into said recessed end portion to reduce relative circumferential movement between the blocks and the segments, and a spring-biased band secured to the blocks, and having portions intermediate adjacent blocks engaging the outer surface of the ring.

2. In a packing arrangement the combination of a rotary shaft, a packing ring having a plurality of segments in archbound relation floating on the shaft, and means for maintaining the segments aligned in such archbound relation and biasing the ring towards a wall in a packing chamber comprising a band with end portions yieldably connected together and surrounding the packing ring, blocks interposed between the band and the segment with each block engaging the end portions of adjacent segments and having a pin projecting into a recess in one of the end portions, said blocks being securely fastened to the band and forming stops, and flat springs engaging the blocks and held in position by said stops.

LAWRENCE B. WALES.